Feb. 18, 1930.  O. KRAMER  1,747,516
BRAKE FOR RAILROAD VEHICLES
Filed July 9, 1928
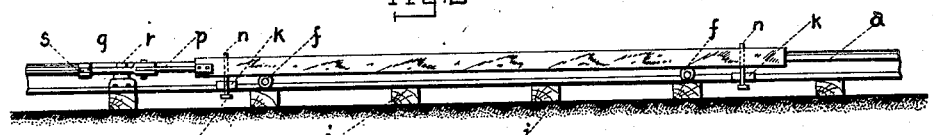
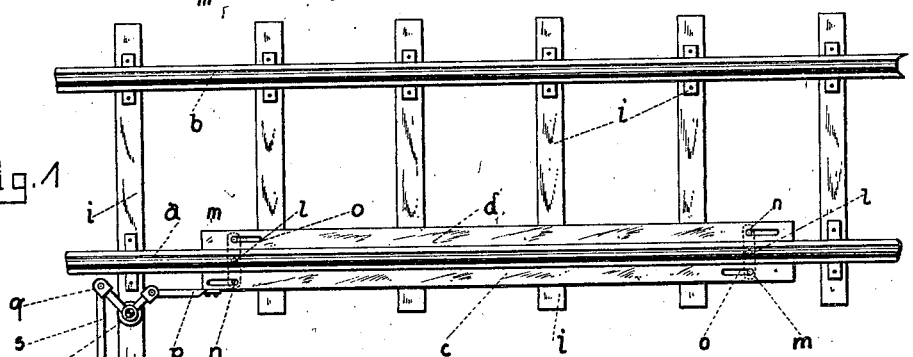
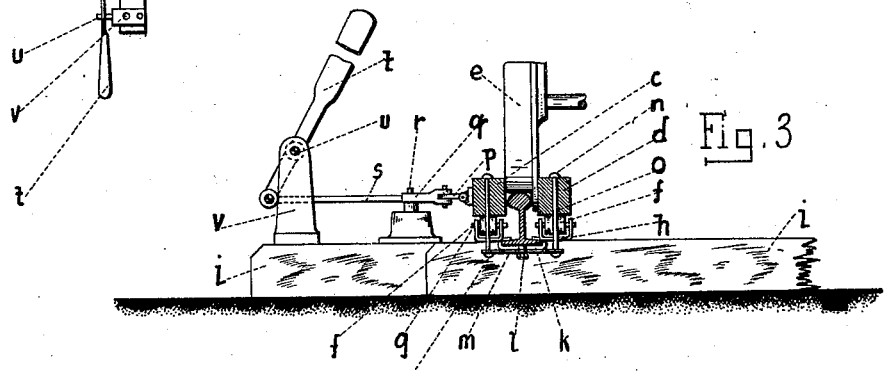
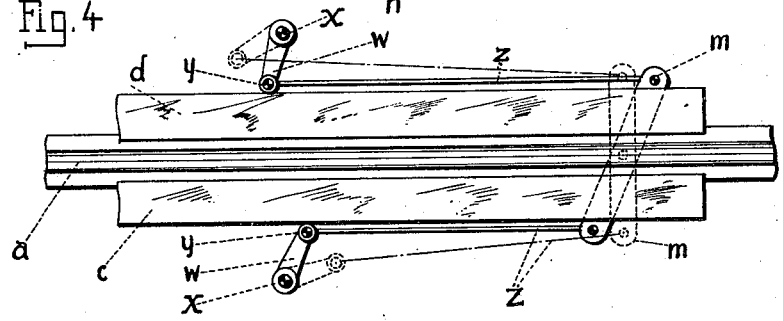
Inventor:
Otto Kramer Patented Feb. 18, 1930

1,747,516

UNITED STATES PATENT OFFICE

OTTO KRAMER, OF REICHARDTSWERBEN, NEAR WEISSENFELS, GERMANY

BRAKE FOR RAILROAD VEHICLES

Application filed July 9, 1928, Serial No. 291,281, and in Germany December 19, 1927.

In shunting railroad vehicles the stopping of the vehicles is generally effected by means of stop blocks which are carried on the vehicle so as to be ready for use. This braking method is inconvenient and uncertain, and the blocks are liable to be left behind on the track as a danger to other traffic.

The object of the present invention is to provide more appropriate braking means, and the invention consists in the provision on the track of brake bars arranged at opposite sides of a rail in an elevated position so as to allow of being pressed against the sides of the vehicle wheels.

Fig. 1 of the accompanying drawings represents a top view of the arrangement,

Fig. 2, a side view of the same,

Fig. 3, a cross-section on an enlarged scale, and

Fig. 4, a top view of a modified arrangement.

Arranged in suitable localities on the track and at opposite sides of the rail $a$ or $b$, or both, are brake bars $c$ and $d$ adapted to be applied to the sides of the vehicle wheels. The brake blocks are for this purpose supported so as to rise above the level of the rails, and means are provided for forcing them toward each other so as to grip the wheels. In the arrangement shown, the brake bars are supported on rollers mounted on axles $g$ in forked brackets $h$, the latter being secured to the sleeper $i$. Connected to the underside of the rail foot $k$ are pivot pins $l$ on which double-armed levers $m$ are adapted to turn in a horizontal plane. Upright bolts $n$ are secured to the ends of the levers and engage in longitudinal slots $o$ in the brake bars. Normally the levers $m$ are in a position at right angles to the brake bars and hold the latter so that the wheels can roll freely on the rail between the bars. However, if the bars are displaced longitudinally, the levers will be turned about their pivots and cause the bars to approach each other, and if this is done while a vehicle passes over the brake, the wheels $e$ will be gripped by the bars and braked.

The brake may be operated by means of a hand lever $t$ which is pivoted at $u$ to a bracket $v$ mounted on one of the sleepers $i$. A rod $s$ connects the lever with a bell-crank $q$ which is pivoted at $r$ to the same sleeper, and a rod $p$ connects the bell-crank with the brake bar $c$. The movement of the latter is transmitted by the levers $m$ to the brake bar $d$.

Levers $m$ may be arranged at frequent intervals along the brake bars so as to prevent the latter from bending and relenting their grip on the wheels. As an alternative remedy against the bending of the bars, the arrangement shown in Fig. 4 may be resorted to. For this purpose, counter-pressure levers $w$ may be applied, the said levers being pivotally mounted on bolts $x$ and connected at $y$ pivotally to links $z$, each link being in connection with the corresponding extremity of the lever $m$. Now, in the position of the brake bars $c$, $d$ being applied to the rails, the levers $w$, owing to the displacement of the links $z$, are forced into their operative position and exert thereby a strong pressure on the lateral surfaces of the said brake bars.

I claim:

1. A brake for railroad vehicles comprising a pair of brake bars arranged on the track parallel with the rails, rollers supporting said bars above the level of the rails, double-armed levers pivoted to the rail and controlling the two bars so as to cause them to approach each other when moved longitudinally, and means for moving the bars so as to clamp them to the wheels of a passing vehicle.

2. A device as claimed in claim 1 wherein the means for moving the bars consist of a hand lever mounted on the track, and operative connections between said hand lever and the bars.

3. The structure claimed in claim 1 in combination with pivoted, lateral supporting struts for the bars, and links connecting said struts with the bars.

OTTO KRAMER.